(12) United States Patent
Chang

(10) Patent No.: US 10,387,625 B2
(45) Date of Patent: Aug. 20, 2019

(54) INPUT DEVICE AND COMPUTER SYSTEM

(71) Applicants: DEXIN ELECTRONIC LTD., Donggaun, Guangdong (CN); DEXIN CORPORATION, New Taipei (TW)

(72) Inventor: Yuan-Jung Chang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 92 days.

(21) Appl. No.: 15/417,155

(22) Filed: Jan. 26, 2017

(65) Prior Publication Data

US 2018/0210649 A1    Jul. 26, 2018

(51) Int. Cl.
| | |
|---|---|
| *G06F 13/00* | (2006.01) |
| *G06F 21/00* | (2013.01) |
| *G06F 3/01* | (2006.01) |
| *G06F 3/02* | (2006.01) |

(52) U.S. Cl.
CPC ............ *G06F 21/00* (2013.01); *G06F 3/01* (2013.01); *G06F 3/0219* (2013.01)

(58) Field of Classification Search
CPC .......... G06F 13/00; G06F 8/60; G06F 13/387; G06F 9/453; G06F 21/35; G06F 3/14; H04L 67/125; H04W 48/08; G06Q 20/04; G06Q 10/00
USPC ..................................... 710/36, 15, 21, 27, 8
See application file for complete search history.

(56) References Cited

U.S. PATENT DOCUMENTS

| | | | | |
|---|---|---|---|---|
| 7,783,309 B2* | 8/2010 | Joung | ................... | H04W 48/08 455/464 |
| 8,407,347 B2* | 3/2013 | Zhang | ....................... | G06F 3/14 709/226 |
| 2004/0249994 A1* | 12/2004 | Shapiro | ................. | H04L 67/125 710/21 |
| 2005/0252960 A1* | 11/2005 | Murata | .................. | G06Q 20/04 235/379 |
| 2006/0047787 A1* | 3/2006 | Agarwal | ................. | G06F 21/35 709/220 |
| 2006/0047789 A1* | 3/2006 | Kumar | ................. | G06Q 10/087 709/220 |
| 2006/0146137 A1* | 7/2006 | Enos | .................. | H04N 1/00132 348/207.2 |
| 2006/0224778 A1* | 10/2006 | Shah | ....................... | G06F 9/453 710/8 |

(Continued)

FOREIGN PATENT DOCUMENTS

| | | |
|---|---|---|
| CN | 101063989 A | 10/2007 |
| CN | 100573611 C | 12/2009 |

(Continued)

*Primary Examiner* — Tim T Vo
*Assistant Examiner* — Kim T Huynh
(74) *Attorney, Agent, or Firm* — Li & Cai Intellectual Property (USA) Office

(57) ABSTRACT

The present disclosure provides an input device capable of communicating with other electronic devices, including a housing, a key module, a communication module and a message prompt module. The key module includes a plurality of keys disposed in the housing. The communication module transmits or receives at least a signal. The message prompt module prompts at least a message. The communication module receives a first signal, and the message prompt module prompts a first preset message corresponding to the first signal.

9 Claims, 6 Drawing Sheets

(56) References Cited

U.S. PATENT DOCUMENTS

| | | | | |
|---|---|---|---|---|
| 2006/0267857 A1* | 11/2006 | Zhang | ................... | G06F 3/14 |
| | | | | 345/1.1 |
| 2009/0138628 A1* | 5/2009 | Kanade | ............... | G06F 13/387 |
| | | | | 710/27 |
| 2009/0293040 A1* | 11/2009 | DeBoer | .................. | G06F 8/60 |
| | | | | 717/109 |
| 2013/0184076 A1 | 7/2013 | Graf et al. | | |
| 2013/0254437 A1* | 9/2013 | Brown | ................ | G06Q 10/00 |
| | | | | 710/36 |
| 2016/0004831 A1* | 1/2016 | Carlson | ............... | G16H 10/20 |
| | | | | 705/2 |

FOREIGN PATENT DOCUMENTS

| | | |
|---|---|---|
| CN | 104423628 A | 3/2015 |
| TW | 327681 B | 3/1998 |
| TW | I261196 B | 9/2006 |
| TW | 200713843 A | 4/2007 |
| TW | M396441 U1 | 1/2011 |

\* cited by examiner

| Message | Preset message | Message content |
|---|---|---|
| First message (S1) | ● ○ ○ ○ | Launching surprise attacks |
| Second message (S2) | ○ ● ○ ○ | Going defensive |
| Third message (S3) | ○ ○ ● ○ | Flanking |
| Fourth message (S4) | ○ ○ ○ ● | Increasing force of attack |

FIG. 3

INPUT DEVICE AND COMPUTER SYSTEM

BACKGROUND OF THE INVENTION

1. Field of the Invention

The present disclosure relates to an input device, more particularly to an input device capable of communicating with other electronic devices.

2. Description of Related Art

For most people today, computers have become an indispensable part of life. With various online interactions such as those in competitive gameplay and social networks, data security for transmission of personal information is increasingly crucial.

For example, most computer games today involve group competition. Team coordination through verbal communication, i.e., by headset microphones, is common. However, verbal communication also allows the opposing team to overhear the issued instructions due to the open nature of this method of communication. Therefore, it takes other communication methods in situations where a private transmission of coordinating instruction is required.

Therefore, providing an electronic device capable of transmitting secret or private messages is an important issue in the art.

SUMMARY OF THE INVENTION

In this regard, the present disclosure provides an input device capable of communicating with other electronic devices, which includes a housing, a key module, a communication module, and a message prompt module. The key module includes a plurality of keys disposed in the housing. The communication module transmits or receives at least one signal. The message prompt module prompts at least one message. The communication module receives a first signal that is transmitted from a distal input device to the communication module by a host, and is encoded in a format recognizable to the input device. The processing module conducts a decoding process on the first signal, and controls the message prompt module to prompt a first preset message corresponding to the first signal according to a result of the decoding process.

One embodiment of the present disclosure provides a computer system comprising a first host, a second host, a first input device and a second input device. The first input device coordinates with the first host, and the second input device coordinates with the second host. The first input device includes a first processing module, a first codec module and a first communication module. The second input device includes a second processing module, a second codec module and a second communication module. The first input device transmits a first preset message to the second input device through the first processing module, the first codec module and the first communication module. Specifically, the first processing module conducts an encoding process on the first preset message by the first codec module and generates a first signal, and the first signal is transmitted to the first host by the first communication module. The first signal is then transmitted to the second input device through the first host and the second host. The second communication module of the second input device receives the first signal and transmits it to the second codec module. The second codec module decodes the first signal and retrieves the first preset message. The second processing module stores the first preset message in a second storing module. The first processing module is electrically connected to the first codec module and the first communication module, and the second processing module is electrically connected to the second codec module and the second communication module.

One embodiment of the present disclosure provides a method of communication between input devices, which includes the steps of: receiving a first signal that is transmitted from a distal input device to an input device by a host and that is encoded in a format recognizable to the input device; decoding the first signal; and controlling a message prompt module to prompt a first preset message corresponding to the first signal according to a result of the decoding.

In summary, the first input device and the second input device in the embodiment of the present disclosure could communicate with similar input devices or other electronic devices, and prompt messages according to the received first and the second signals. Therefore, the present disclosure protects the message by codec, and prompts the message so that the user won't miss any important messages. In addition, the input device of the present disclosure includes a codec function to encode and decode the messages transmitted among the hosts so that the risk of the transmission packets being intercepted or cracked is reduced.

In order to further the understanding of the present disclosure, the following embodiments are provided along with illustrations to facilitate the disclosure of the present disclosure.

BRIEF DESCRIPTION OF THE DRAWINGS

FIG. 3 is a schematic diagram of a preset message table according to one embodiment of the present disclosure;

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. However, the concept of the present disclosure may be embodied in many different forms and should not be construed as being limited to the embodiment set forth herein the exemplary embodiment.

It should be understood that although the terms used herein may be a first, second, third, etc., to describe various elements, these elements should not be bound by such terms. Such terminology is used to distinguish one element from another. Therefore, the first element discussed below could be termed a second element without departing from the teachings of the concept of the present disclosure.

The followings include at least one embodiment and drawing to describe the input device of the present disclosure. However, the present disclosure is not bounded by the following embodiments.

[Exemplary Embodiment of the Input Device According to the Present Disclosure]

Figure 1:
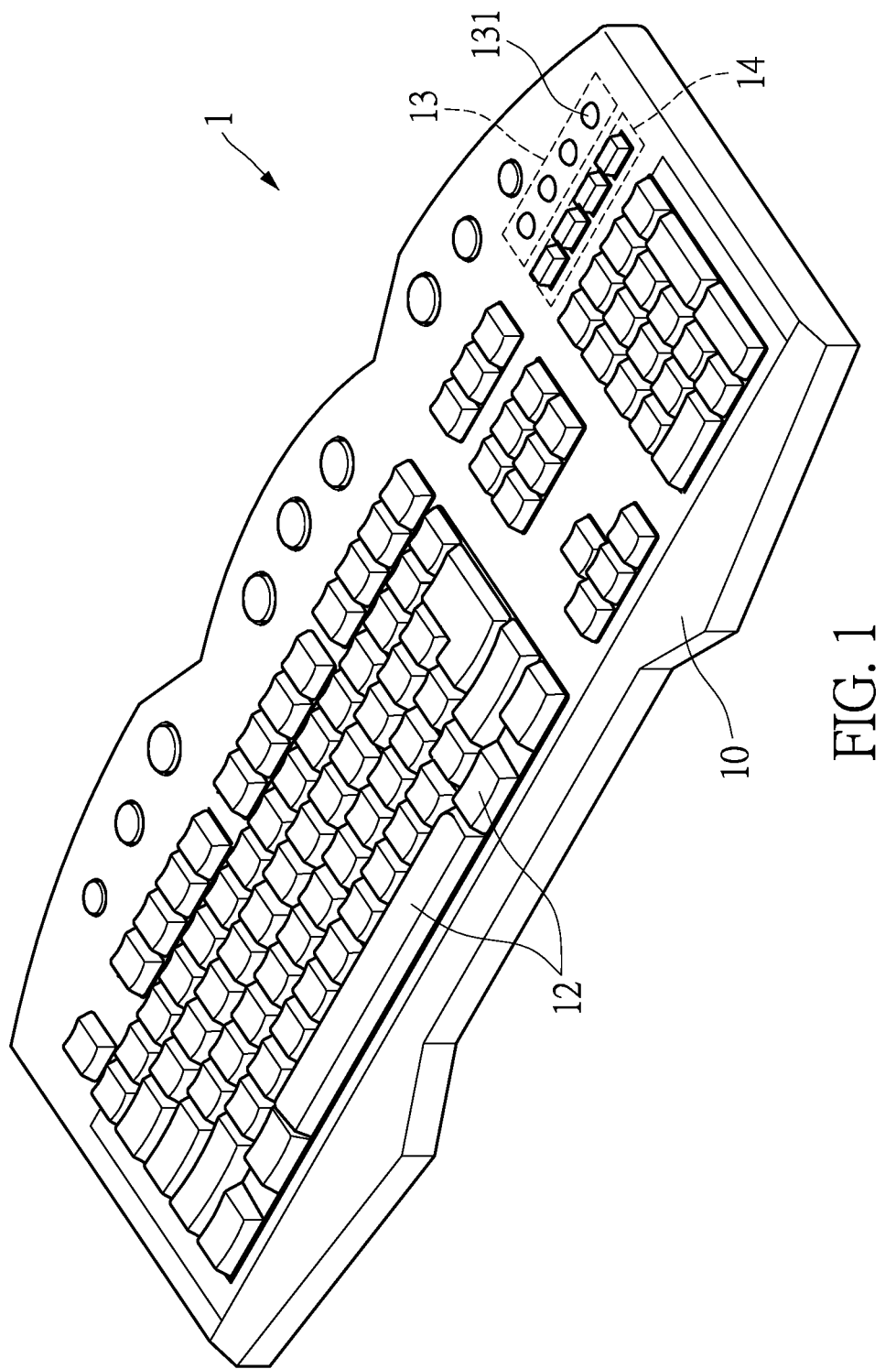
FIG. 1 is a schematic diagram of a first input device according to one embodiment of the present disclosure.
Figure 2:
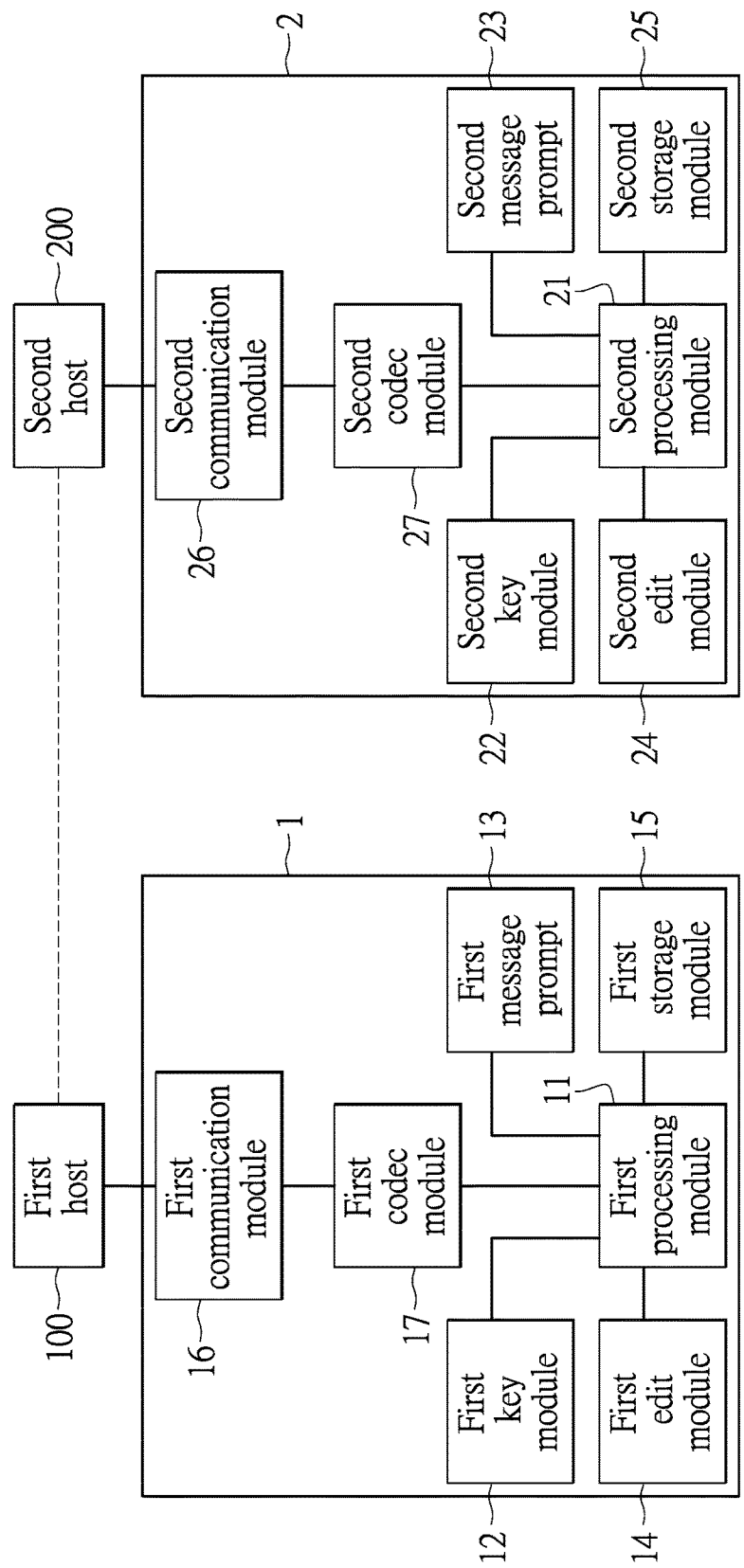
FIG. 2 is a schematic diagram of a computer system according to one embodiment of the present disclosure.

Referring to FIGS. 1 to 3, FIG. 1 is a schematic diagram of a first input device according to one embodiment of the present disclosure; FIG. 2 is a schematic diagram of a computer system according to one embodiment of the present disclosure; and FIG. 3 is a schematic diagram of a preset message table according to one embodiment of the present disclosure.

The first input device 1 connects to a first host 100, a second input device 2 connects to a second host 200. The first input device 1 includes a first housing 10, a first processing module 11, a first key module 12, a first message prompt module 13, a first edit module 14, a first storage module 15 and a first communication module 16. The second input device 2 includes a second housing 20, a second processing module 21, a second key module 22, a second message prompt module 23, a second edit module 24, a second storage module 25 and a second communication module 26. The first input device 1 connects to the first host 100 by the first communication module 16.

In the present embodiment, the first input device 1 and the second input device 2 are keyboards or mouses.

The first key module 12 and the second key module 22 include a plurality of keys for inputting characters, symbols or numbers. The first message prompt module 13 and the second message prompt module 23 could be light display modules, liquid crystal display modules, or buzzer modules. In the present embodiment, the first message prompt module 13 includes a plurality of light emitting elements 131, which are disposed on the first housing 10 of the first input device 1. In other embodiments, the plurality of light emitting elements 131 of the first message prompt module 13 could be disposed under the keys, i.e., within the first housing 10, as backlight of the first key module 12. However, the present disclosure is not limited by the arrangement of the plurality of light emitting elements 131.

In the present embodiment, the first communication module 16 and the second communication module 26 could be, but are not limited to, wireless communication modules or wired communication modules. In other embodiments, the first communication module 16 and the second communication module 26 could be, but are not limited to, Bluetooth communication modules, low-power Bluetooth communication modules or Wi-Fi communication modules.

In the present embodiment, the first communication module 16 of the first input device 1 receives a first signal S1 transmitted through the second input device 2, the second host 200 and the first host 100. In the present embodiment, the first signal S1 is encoded in a format recognizable to the first input device 1 and the second input device 2. Therefore, the first processing module 11 conducts a decoding process on the first signal S1, and controls the message prompt module 13 to prompt a first preset message corresponding to the first signal S1 according to a result of the decoding process.

In the present embodiment, the first storage module 15 and the second storage module 25 store a preset message table used by the first processing module 11 and the second processing module 21 respectively, to conduct the encoding or decoding process.

In the present embodiment, the first signal S1 is encoded in a keyboard light command format that the first host 100 transmits to the first input device 1, or is encoded in a keyboard light command format that the second host 200 transmits to the second input device 2.

In the present embodiment, the first edit module 14 includes a plurality of edit keys to edit a second preset message, which is stored in the first storage module 15. The first processing module 11 encodes the second preset message to a second signal S2. The second signal S2 is transmitted to the first host 100 by the first communication module 16, and then transmitted to the second host 200 by the first host 100.

Similarly, the second signal S2 is encoded in a keyboard light command format that the first host 100 transmits to the first input device or the second host 200 transmits to the second input device 2. Therefore, when the second signal S2 is transmitted to the second input device 2, the second processing module 21 conducts a decoding process on the second signal S2 to retrieve the second preset message, and then controls the second message prompt module 23 to prompt the second preset message. In the present embodiment, the second message prompt module 23 prompts the second preset message immediately when the second input device 2 receives the second signal S2.

In other embodiments, the second processing module 21 stores the second signal S2 in the second storage module 25 when the second input device 2 receives the second signal S2 as long as the user does not press a decoding key or a preset decoding key combination. Meanwhile, the second message prompt module 23 notifies the user that a message is pending and asks the user whether to receive the message or not. When the user presses the decoding key or the preset decoding key combination, the second processing module 21 conducts a decoding process on the second signal S2 stored in the second storage module 25 to retrieve the second preset message, and then controls the second message prompt module 23 to prompt the second preset message.

In the present embodiment, the first input device 1 further includes a first codec module 17, and the second input device 2 further includes a second codec module 27. The first processing module 11 conducts an encoding process or a decoding process by the first codec module 17. Similarly, the second processing module 21 conducts the encoding process or the decoding process by the second codec module 27. In the present embodiment, the first codec module 17 and the second codec module 27 are implemented in hardware. However, in other embodiments, the first codec module 17 and the second codec module 27 could be implemented in software or firmware. The present disclosure is not limited by the type of implementation of the first codec module 17 and the second codec module 27.

In the present embodiment, the message prompt module 13 includes a plurality of independent light emitting elements 131 to emit light. Therefore, the first preset message is presented by the combination of ON/OFF of the plurality of light emitting elements 131, i.e., the combination of bright and dark signals. In other embodiments, the message prompt module 13 could be, but is not limited to, a liquid crystal display, an LED display, an OLED display or other displays for displaying text, symbols or messages.

In other embodiments, the first edit module 14 could be part of the first key module 12. After a mode switching, the first edit module 14 allows the user to input the first preset message or the second preset message. In the present embodiment, as shown in FIG. 1, the first edit module 14 includes a plurality of keys independent from the key module 12. The user could edit other preset messages using the first edit module 14.

In other embodiments, the first input device 1 could further include a hotkey module (not shown in drawings). The hotkey module includes a plurality of keys, which indicate the signals S1 to S4 in FIG. 3 respectively. The first signal S1 is sent when the user presses the key indicating the first signal S1, the second signal S2 is sent when the user presses the key indicating the second signal S2, and so forth.

In the present embodiment, the first storage module 15 and the second storage module 25 store a preset message table (shown in FIG. 3). When the first communication module 16 of the first input device 1 receives the first signal S1 from the second input device 2, the first processing module 11 controls the first message prompt module 13 to prompt a first preset message (●○○○) corresponding to the first signal S1 according to the preset message table. In the present embodiment, the first message prompt module 13 includes the plurality of light emitting elements 131. The "●" symbol in the preset message table indicates that the corresponding light emitting element is inactive. The "○" symbol in the preset message table, on the other hand, indicates that the corresponding light emitting element is active. Therefore, the plurality of light emitting elements convey a customized message similar to Morse code. In other embodiments, the message prompt module 13 could be, but is not limited to, a liquid crystal display, an LED display, an OLED display or other displays for displaying text messages, emoticons or other preset picture messages directly.

In the present embodiment, the first signal S1, the second signal S2, the third signal S3 and the fourth signal S4 in the preset message table are predetermined so that the users of the first input device 1 and the second input device 2 could understand each other by referring to the preset message table. The user could also customize the preset message table to fit particular needs. For example, in a video game competition, the team coordination is important. During a competition with two opposing sides, for example, it is not appropriate to transmit publicly in-game instructions such as those for launching surprise attacks, going defensive, flanking, increasing force of attack and so forth. In this case, the preset messages in the first input device 1 of the present disclosure are ideal for team coordination. In addition, since the first input device 1 is an input tool used frequently by the user, prompting the preset message on the first input device 1 meets the need for convenience and privacy.

[Exemplary Embodiment of the Computer System According to the Present Disclosure]

Figure 4:
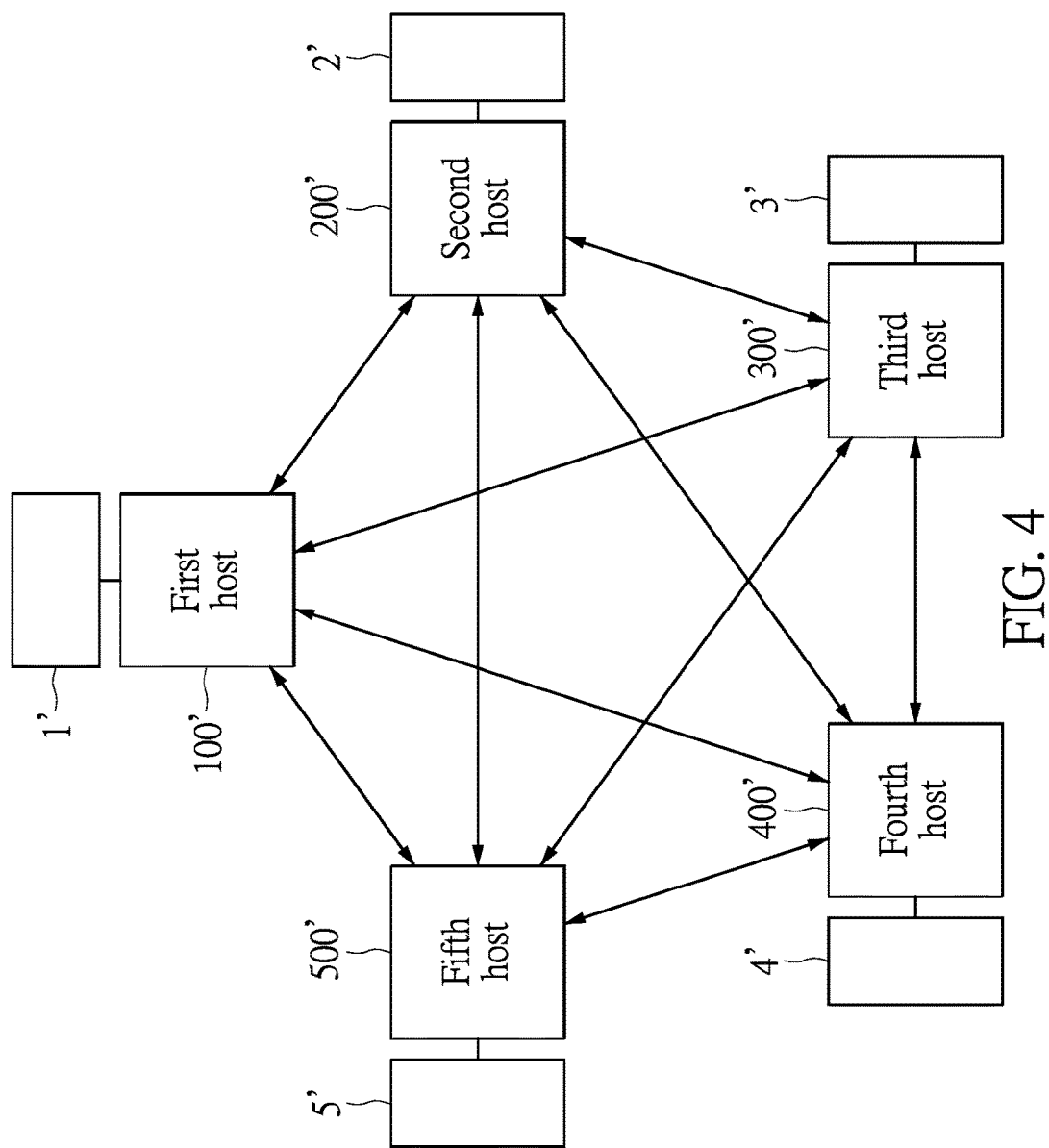
FIG. 4 is a schematic diagram of another computer system transmitting encoded messages according to one embodiment of the present disclosure.
Figure 5:
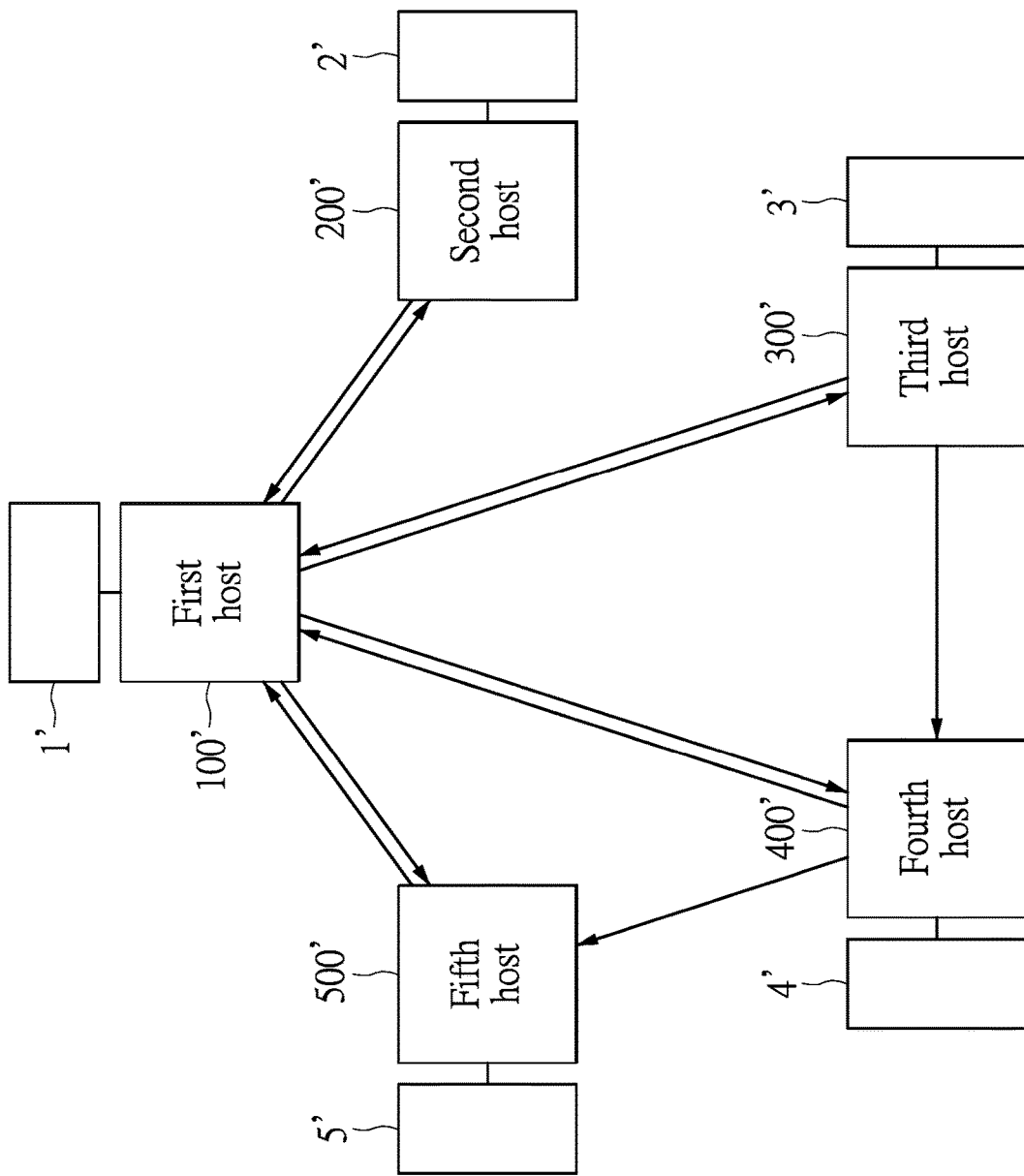
FIG. 5 is a schematic diagram of another computer system transmitting encoded messages according to one embodiment of the present disclosure.

Referring to FIGS. 4 and 5, FIG. 4 is a schematic diagram of a computer system transmitting encoded messages according to one embodiment of the present disclosure; and FIG. 5 is a schematic diagram of another computer system transmitting encoded messages according to one embodiment of the present disclosure.

In FIGS. 4 and 5, the first host 100', the second host 200', the third host 300', the fourth host 400' and the fifth host 500' have structures similar to the first host 100 and the second host 200 in the aforementioned embodiments; the first input device 1', the second input device 2', the third input device 3', the fourth input device 4' and the fifth input device 5' have structures similar to the first input device 1 and the second input device 2 in the aforementioned embodiments. Therefore, their structures and functions are not reiterated herein.

The first input device 1' coordinates with the first host 100', the second input device 2' coordinates with the second host 200', the third input device 3' coordinates with the third host 300', the fourth input device 4' coordinates with the fourth host 400' and the fifth input device 5' coordinates with the fifth host 500'.

In the present embodiment, each host could transmit encoded signals to other hosts in the same manner described previously. The first codec module (not shown in drawings) of the first host 100' conducts the encoding process and decoding process, as does the second codec module (not shown in drawings) of the second host 200', the third codec module (not shown in drawings) of the third host 300', the fourth codec module (not shown in drawings) of the fourth host 400' and the fifth codec module (not shown in drawings) of the fifth host 500'.

Referring to FIG. 4, each host and its coordinating input device receive the encoded messages from other hosts and their coordinating input devices. Similarly, each host and its coordinating input device could transmit the encoded messages to other hosts and their coordinating input devices.

As shown in FIG. 5, the first host 100' and the first input device 1' transmit the encoded signal to the second host 200' and the second input device 2, the third host 300' and the third input device 3', the fourth host 400' and the fourth input device 4' and the fifth host 500' and the fifth input device 5'. The second host 200' and the second input device 2', the fifth host 500' and the fifth input device 5' transmit the encoded signal to the first host 100' and the first input device 1' directly.

The third host 300' and the third input device 3' transmit the encoded signal to the first host 100' and the first input device 1', and the fourth host 400' and the fourth input device 4'. The fourth host 400' and the fourth input device 4' transmit the encoded signal to the first host 100' and the first input device 1', and the fifth host 500' and the fifth input device 5'.

In the present embodiment, each input device could selectively transmit the encoded signal to other input devices. For example, the first input device 1' may select the targeted input device to transmit the first preset message or the second preset message using a first key module (not shown in drawings) or a first edit module (not shown in drawings). In other embodiments, each input device could define a correspondence between keys and targeted input devices using the first edit module (not shown in drawings) or the first key module (not shown in drawings) so that an encoded signal is transmitted to the targeted input device as the corresponding key is pressed.

[Exemplary Embodiment of Communication Method According to the Present Disclosure]

Figure 6A:
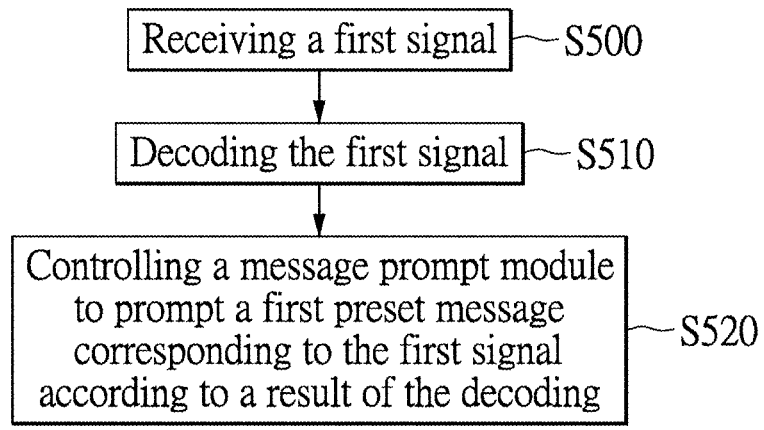
FIG. 6A is a flowchart of a method of communication between input devices according to one embodiment of the present disclosure.
Figure 6B:
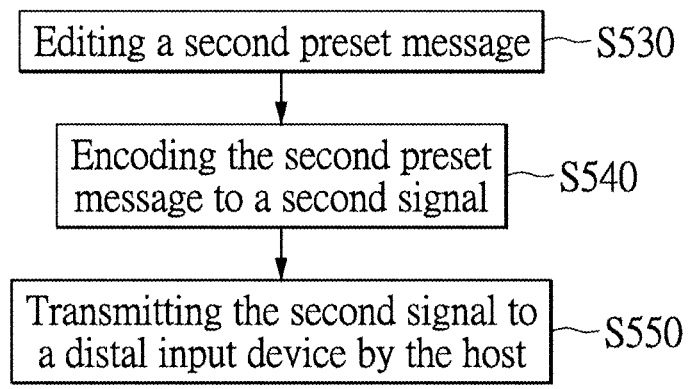
FIG. 6B is a flowchart of another method of communication between input devices according to one embodiment of the present disclosure.

Referring FIGS. 6A and 6B, FIG. 6A is a flowchart of a communication method using the input device in the present disclosure; FIG. 6B is a flowchart of another communication method using the input device in the present disclosure. In the present embodiment, the input device used in the communication method is similar to the first input device 1 and the second input device 2 described in previous embodiments. Therefore, the details of the first input device 1 and the second input device 2 are not reiterated herein.

The communication method includes the steps of: receiving a first signal (S500); decoding the first signal (S510); and controlling a message prompt module of an electronic device to prompt a first preset message corresponding to the first signal according to a result of the decoding (S520).

The communication method further includes the steps of: editing a second preset message (S530); encoding the second preset message to a second signal (S540); and transmitting the second signal to a distal input device by the host (S550).

In the present embodiment, the electronic device is an input device, specifically, a keyboard or a mouse.

In step S500, the first signal is transmitted from a distal input device to the input device by the host, and the first signal is encoded in a format recognizable to the input device. In step S540, the second signal is encoded in a format recognizable to the input device. That is, the first signal and the second signal are encoded in a format recognizable to both the input device 1 and input device 2.

In step S500 and step S540, the first signal and the second signal are encoded in a keyboard light command format that the host transmits to the input device.

In step S530, the second message is edited by a first key module 12, a second key module 22, a first edit module 14 or a second edit module 24.

The step S510 and step S540 conduct the encoding process or the decoding process using the first processing module 11 or the second processing module 21. In other embodiments, the first input device further includes a first codec module 17 and the second input device further comprises a second codec module 27. The first processing module 11 uses the first codec module 17 to conduct an encoding process or a decoding process. The second processing module 21 uses the second codec module 27 to conduct an encoding process or a decoding process. The first codec module 17 and the second codec module 27 are implemented in hardware. However, the first module 17 and the second codec module 27 could be implemented in software or firmware as well in other embodiments. The present disclosure is not limited by the type of implementation of the codec modules.

[Effect of the Exemplary Embodiments]

In summary, the first input device and the second input device in the embodiment of the present disclosure could communicate with similar input devices or other electronic devices, and prompt messages according to the received first and the second signals. Therefore, the present disclosure protects the message by codec, and prompts the message so that the user won't miss any important messages. In addition, the input device of the present disclosure includes a codec function to encode and decode the messages transmitted among the hosts so that the risk of the transmission packets being intercepted or cracked is reduced.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An input device capable of communicating with other electronic devices, comprising:
   a housing;
   a key module including a plurality of keys disposed in the housing;
   a communication module for transmitting or receiving at least one signal;
   a processing module;
   a message prompt module for prompting at least one message; wherein the message prompt module is included in the input device; and
   a codec module used by the processing module to decode a first signal or to encode a second preset message;
   wherein the communication module receives a first signal that is transmitted from a distal input device to the communication module by a host and is encoded in a format recognizable to the input device;
   wherein the processing module conducts a decoding process on the first signal, and controls the message prompt module to prompt a first preset message corresponding to the first signal according to a result of the decoding process;
   wherein the first signal is encoded in a keyboard light command format that the host transmits to the input device, a first message content corresponding to the first preset message is decoded by a preset message table for a user using the input device.

2. The input device according to claim 1, further comprising:
   a storage module storing the preset message table used by the processing module to decode the first signal.

3. The input device according to claim 2, further comprising:
   an edit module including a plurality of edit keys to edit a second preset message, the second preset message being stored in the storage module, wherein the second preset message is encoded to a second signal by the processing module and transmitted to the host by the communication module, and the second signal is transmitted to the distal input device by the host; wherein the second signal is encoded in the keyboard light command format that the host transmits to the distal input device.

4. The input device according to claim 1, wherein the host is a computer system and the input device is a keyboard or a mouse.

5. The input device according to claim 1, wherein the message prompt module is a light display module, a liquid crystal display module, a buzzer module, or any combination thereof.

6. A computer system, comprising:
   a first host;
   a first input device coordinating with the first host, the first input device comprising:
   a first processing module;
   a first codec module; and
   a first communication module, wherein the first processing module is electrically connected to the first codec module and the first communication module;
   a second host connected to the first host; and
   a second input device coordinating with the second host, the second input device comprising:
   a second processing module;
   a second codec module; and
   a second communication module, wherein the second processing module is electrically connected to the second codec module and the second communication module;
   wherein the first input device transmits a first preset message to the second input device through the first processing module, the first codec module and the first communication module, the first processing module conducting an encoding process on the first preset message by the first codec module and generating a first signal, the first signal being transmitted to the first host by the first communication module, the first signal being transmitted to the second input device through the first host and the second host, the second communication module of the second input device receiving the first signal, the first signal being transmitted to the second codec module and underwent a decoding process to retrieve the first preset message, and the second processing module storing the first preset message in a second storing module;

wherein the second processing module conducts a decoding process on the first signal, and controls a second message prompt module of the second input device to safely prompt the first preset message corresponding to the first signal according to a result of the decoding process;

wherein the first signal is encoded in a keyboard light command format that the host transmits to the input device, a first message content corresponding to the first preset message is decoded by a preset message table for a user using the input device.

7. A computer system according to claim 6 wherein the first host further includes a first storage module in which the first preset message is stored.

8. A method of communication between input devices, comprising the steps of:

receiving a first signal, wherein the first signal is transmitted from a distal input device to an input device by a host, and the first signal is encoded in a format recognizable to the input device;

decoding the first signal by a codec module of the input device; and controlling a message prompt module of the input device to safely prompt a first preset message corresponding to the first signal according to a result of the decoding, wherein the message prompt module is included in the input device;

wherein the first signal is encoded in a keyboard light command format that the host transmits to the input device, a first message content corresponding to the first preset message is decoded by a preset message table for a user using the input device.

9. The method of communication between input devices according to claim 8, further comprising steps of:

editing a second preset message;

encoding the second preset message and generating a second signal, wherein the second signal is encoded in a format recognizable to the input device; and transmitting the second signal to the distal input device by the host.

* * * * *